(12) United States Patent
Gehlhoff

(10) Patent No.: US 7,490,626 B2
(45) Date of Patent: Feb. 17, 2009

(54) STEER VALVE WITH HYDRAULIC VEHICLE POSITION FEEDBACK

(75) Inventor: Wade L. Gehlhoff, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 664 days.

(21) Appl. No.: 11/246,408

(22) Filed: Oct. 7, 2005

(65) Prior Publication Data

US 2007/0079881 A1    Apr. 12, 2007

(51) Int. Cl.
*B62D 5/083* (2006.01)
*B62D 5/097* (2006.01)

(52) U.S. Cl. ............... 137/625.24; 60/384; 60/387
(58) Field of Classification Search ........... 137/625.21, 137/625.23, 625.24; 60/384, 387, 452
See application file for complete search history.

(56) References Cited

U.S. PATENT DOCUMENTS

| | | | | |
|---|---|---|---|---|
| 2,613,703 A | * | 10/1952 | Calvert | 60/387 |
| 3,482,398 A | * | 12/1969 | Christensen | 60/384 |
| 3,525,212 A | * | 8/1970 | Gallant | 60/387 |
| 3,584,537 A | * | 6/1971 | Schulz | 60/384 |
| 4,096,883 A | * | 6/1978 | Yip | 137/625.24 |
| 4,553,389 A | * | 11/1985 | Tischer et al. | 60/384 |
| 4,620,416 A | | 11/1986 | Yip et al. | |
| 4,759,182 A | | 7/1988 | Haarstad | |
| 4,972,916 A | * | 11/1990 | Miller | 60/387 |
| 5,975,138 A | * | 11/1999 | Uppal | 137/625.24 |
| 6,782,698 B2 | * | 8/2004 | Gehlhoff | 60/452 |
| 2003/0037827 A1 | * | 2/2003 | Novacek | 137/625.22 |

* cited by examiner

*Primary Examiner*—John Rivell
(74) *Attorney, Agent, or Firm*—Sony N. Weaver; Loren H. Uthuff, Jr.

(57) ABSTRACT

A fluid controller (17) controls a main fluid path (18) from a pump (11) to a primary steering cylinder (19) and a second fluid path (26) from a fluid meter (37) to a second cylinder (31). A mechanical or electrical linkage (149) couples the primary steering cylinder (19) to the second cylinder (31) such that displacement of the primary cylinder (19) results in proportional corresponding displacement of the second cylinder (31). The main fluid path (18) and the second fluid path (26) are maintained separate from each other. As such, the main fluid path (18) provides pressurized fluid from the pump to the primary steering cylinder (19) without communicating main fluid flow to the secondary cylinder (31). Due to the separate fluid paths, the present invention can be used to provide a substantial amount of fluid through a fluid controller (17) with a relatively small displacement fluid meter (37).

10 Claims, 7 Drawing Sheets

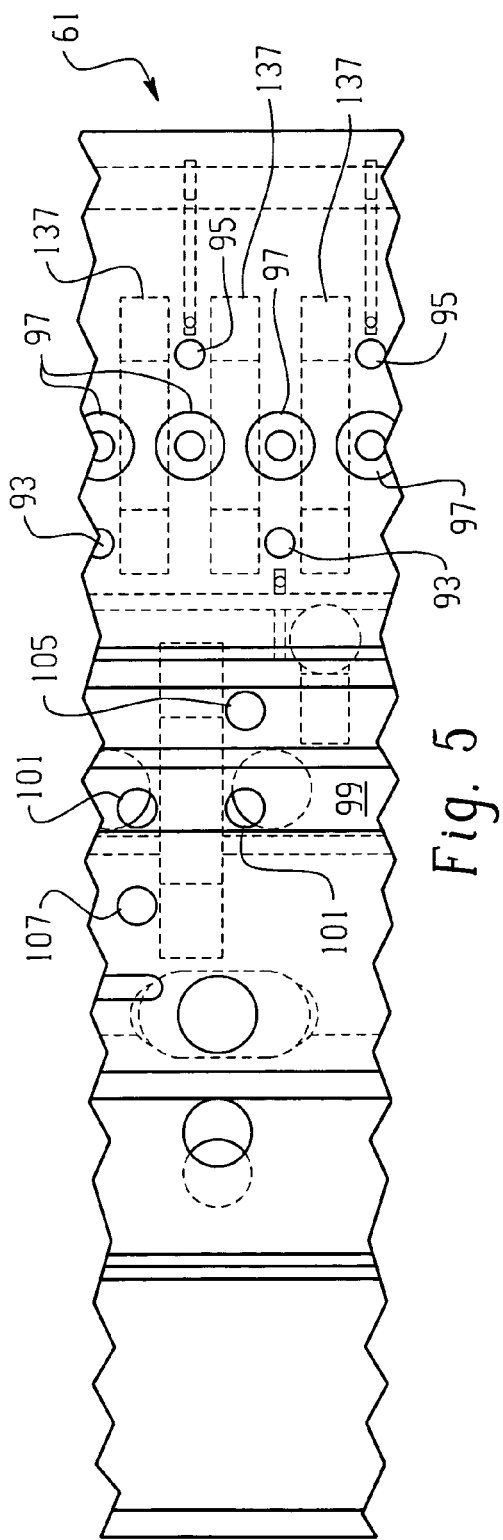
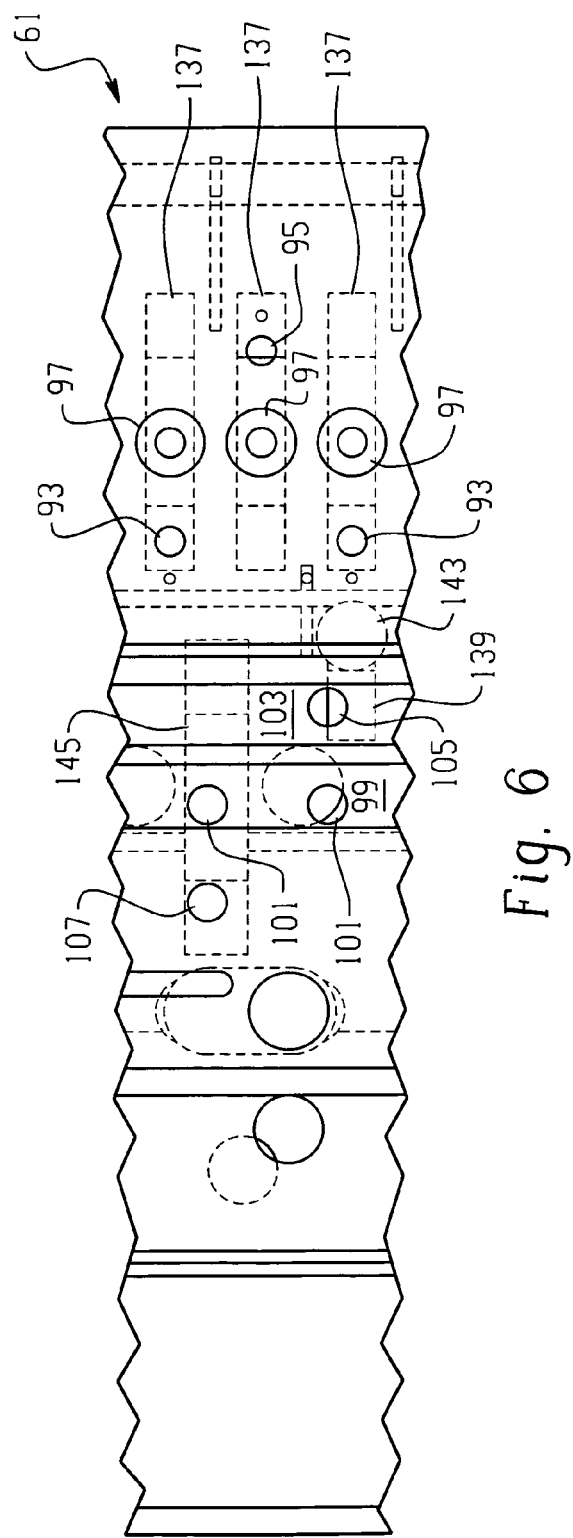

STEER VALVE WITH HYDRAULIC VEHICLE POSITION FEEDBACK

BACKGROUND OF THE DISCLOSURE

The present invention relates to fluid controllers of the type used to control the flow of fluid from a source of pressurized fluid to a fluid pressure actuated device, such as a steering cylinder.

Although the present invention may be used with fluid controllers of many types, and having various constructions and applications, it is especially advantageous when used with a full-fluid-linked steering controller, for use on a vehicle of primarily the "off highway" type. Therefore, the present invention will be described in connection therewith.

A typical prior art fluid controller and valving therefor is illustrated in U.S. Pat. No. 4,620,416, assigned to the assignee of the present invention and incorporated herein by reference. The typical prior art fluid controller of the type to which the present invention relates includes a housing which defines various fluid ports, and further includes a fluid meter, a valve means defining a main fluid path, and an arrangement for imparting follow-up movement to the valve means, in response to the flow of fluid through the fluid meter.

In the typical prior art fluid controller, all flow to the fluid pressure actuated device must first pass through the fluid meter. Thus, the typical prior art fluid controller requires a relatively large displacement fluid meter when used in large "off highway" vehicles. However, the use of large displacement fluid meters in the fluid controller adds substantially to the size and cost of the controller.

U.S. Pat. No. 4,759,182, assigned to the assignee of the present invention and incorporated herein by reference, addressed the above-described size and cost concerns by disclosing a fluid controller with the capability of providing flow, to the fluid pressure actuated device, wherein the flow to the device (steering cylinder) is substantially larger than the flow through the fluid meter of the controller. While the fluid controller of the '182 patent continues to be a commercially successful product used in many hydraulic applications, the overall stability of a steering system using such a "flow amplification" controller decreases, in some instances, when the ratio of the total flow to the flow through the fluid meter is substantially larger than about 2:1

BRIEF SUMMARY OF THE INVENTION

Accordingly, it is an object of the present invention to provide an improved fluid controller for use in a vehicle steering system which can provide a substantially larger ratio of total flow to the fluid pressure actuated device to the flow through the fluid meter.

The above and other objects of the present invention are accomplished by providing an improved fluid controller of the type including housing means defining an inlet port for connection to the source of pressurized fluid, a return port for connection to a reservoir, and first and second control ports for connection to the first fluid pressure actuated device. A valve means is disposed in the housing means and defines a neutral position and a first operating position. The housing means and the valve means cooperate to define a main fluid path communicating between the inlet port and the first control fluid port, and between the second control fluid port and the return port when the valve means is in the first operating position. A fluid actuated means imparts follow-up movement to the valve means that is proportional to the volume of fluid flow through the fluid actuated means.

The improved controller is characterized by a second fluid pressure actuated device the displacement of which is representative of the displacement of the first fluid pressure actuated device when the valve means is displaced from the neutral position to the first operating position. A second fluid path communicates between the fluid actuated means and the second fluid actuated device. The second fluid path is separate from the main fluid path.

The improved controller is further characterized by the valve means comprising a primary, rotatable valve member and a cooperating, relatively rotatable valve member.

BRIEF DESCRIPTION OF THE DRAWINGS

FIG. 5 is a fragmentary overlay view of the primary and follow-up valve members in the neutral position.

FIG. 6 is a fragmentary overlay view of the primary and follow-up valve members similar to FIG. 5, but with the valving displaced from the neutral position, to an operating position.

DETAILED DESCRIPTION OF THE PREFERRED EMBODIMENT

Figure 1:
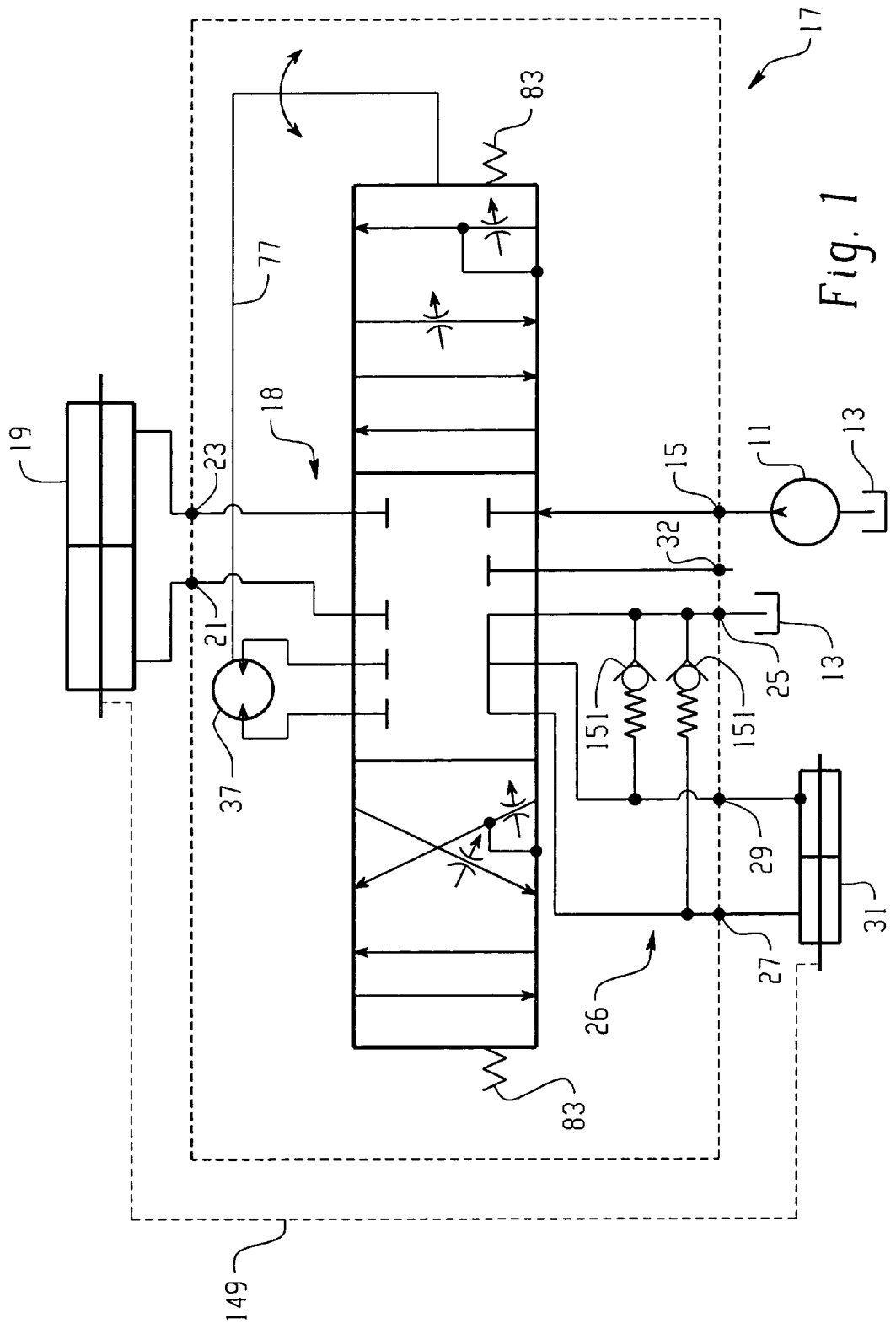
FIG. 1 is a hydraulic schematic of a hydrostatic power steering system including a fluid controller made in accordance with the present invention.

Referring now to the drawings, which are not intended to limit the invention, FIG. 1 is a hydraulic schematic of a vehicle hydrostatic steering system and a fluid controller made in accordance with the teachings of the present invention. The system includes a fluid pump 11, shown herein as a fixed displacement pump, having its inlet connected to a system reservoir 13. The outlet of the pump 11 is communicated to an inlet port 15 of a fluid controller, generally designated 17.

Referring still to FIG. 1, the fluid controller 17 controls a main fluid path, generally designated 18, from the pump 11 to a primary steering cylinder 19, or some other suitable fluid pressure operated steering actuator or device, all of which are within the scope of the invention. The fluid controller 17 includes a pair of primary control fluid ports 21 and 23, which are connected to the opposite ends of the steering cylinder 19, and a return port 25, which returns fluid to the reservoir 13. The fluid controller 17 also controls a secondary fluid path, generally designated 26, which will be described in greater detail subsequently. The fluid controller 17 includes a pair of secondary control fluid ports 27 and 29 which are connected to opposite ends of a secondary cylinder 31, the function of which will also be described in greater detail subsequently.

The fluid controller 17 also includes a load sense port 32, which would be connected to a load sensing device for varying the fluid volume output of the pump, if a load sensing pump were used in the system, instead of the fixed displacement pump 11 shown herein.

Figure 2:
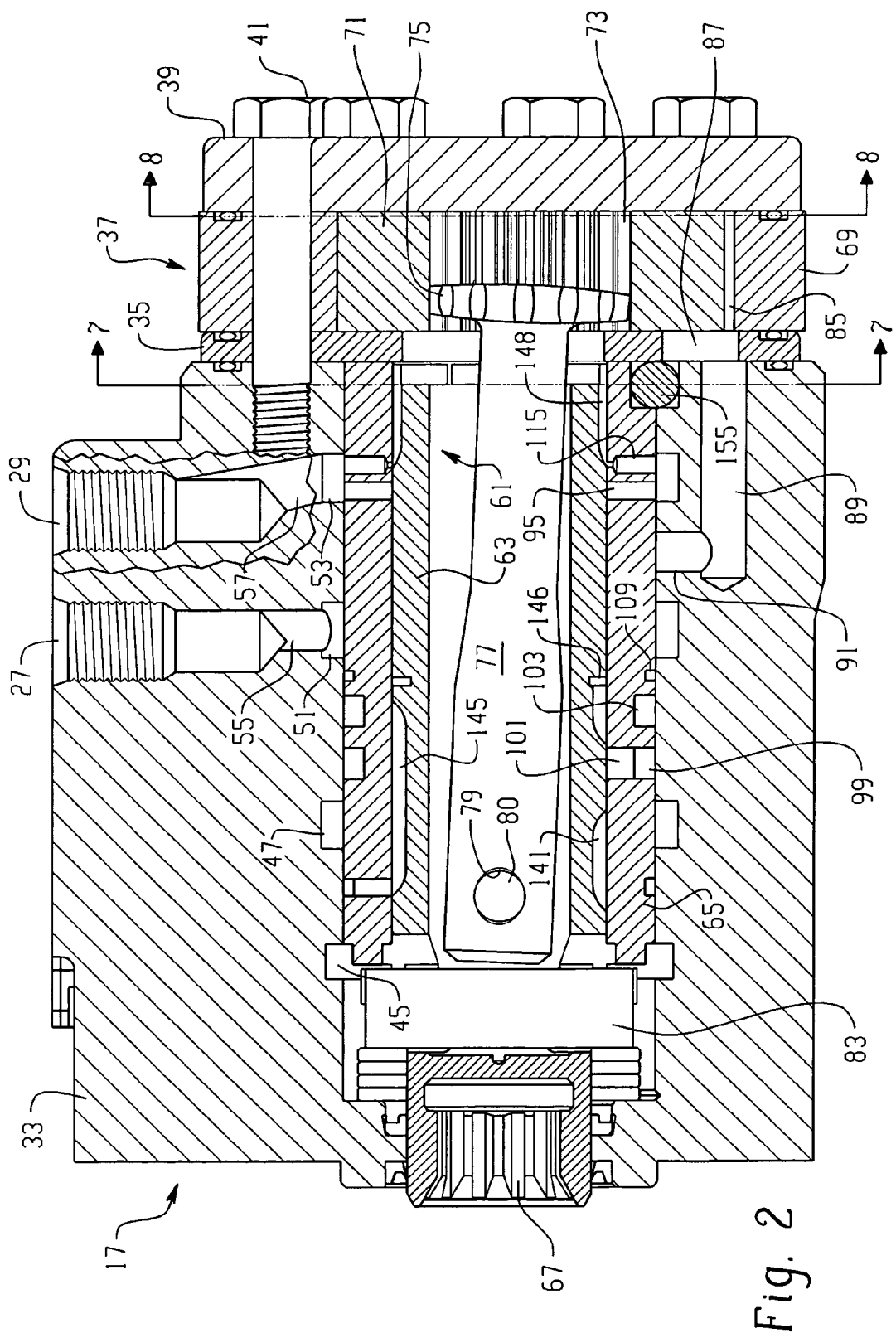
FIG. 2 is an axial cross section of the fluid controller, as shown schematically in FIG. 1, made in accordance with the present invention and includes a fragmentary section taken on a different plane.

Referring now to FIG. 1 and FIG. 2, the fluid controller 17, shown schematically in FIG. 1, includes a valve housing 33, a port plate 35, a fluid meter 37, and an end plate 39. The sections are held together in tight sealing engagement by means of a plurality of bolts 41, in threaded engagement with the valve housing 33.

The valve housing 33 defines an fluid inlet passage 43 (see FIG. 3a, not shown in FIG. 2) communicating with the fluid inlet port 15, a fluid return annular groove 45 communicating with the fluid return port 25 through a return fluid passage (not shown), a left primary control fluid annular groove 47 communicating with the left primary control fluid port 21 through a left primary control fluid passage (not shown), and a right primary control fluid passage 49 (see FIG. 3a, not shown in FIG. 2) communicating with the right primary control fluid port 23. Also defined by the valve housing 33 are left and right annular grooves 51 and 53 communicating with the left and right secondary control fluid ports 27 and 29, respectively, through left and right secondary control fluid passages 55 and 57, respectively.

The valve housing 33 also defines a valve bore 59 in which is disposed the controller valving, generally designated 61. In the subject embodiment, and by way of example only, the controller valving includes a primary, rotatable valve member 63, also referred to hereinafter as the "spool", and a follow-up valve member 65, also referred to hereinafter as the "sleeve". At the forward end of the spool 63 is a portion having a reduced diameter and defining a set of internal splines 67 which provide for a direct mechanical connection between the spool 63 and an input device, such as a steering wheel (not shown) or handlebar (not shown). The spool 63 and the sleeve 65 will be described in greater detail subsequently.

The fluid meter 37 includes an internally toothed ring 69, and an externally toothed star 71. The star defines a set of internal splines 73, and in splined engagement therewith is a set of external splines 75 formed on the rearward end of a drive shaft 77. The drive shaft 77 has an opening 79 in the forward end permitting driving connection between the drive shaft 77 and the sleeve 65, by means of a pin 80 passing through a pair of openings 81 (see FIG. 4, not shown in FIG. 2) in the spool 63 and a pair of openings 82 (see FIG. 3, not shown in FIG. 2) in the sleeve 65. As will be discussed in greater detail below, displacement of the secondary cylinder 31 causes fluid to flow through the fluid meter 37 which causes orbital and rotational movement of the star 71. Such movement of the star 71 causes follow-up movement of the sleeve 65, by means of the drive shaft 77 and pin 80, to maintain a particular relative displacement between the spool 63 and sleeve 65, proportional to the rate of rotation of the steering wheel. A plurality of leaf springs 83 extend through an opening in the spool 63, biasing the spool 63 toward the neutral position, relative to the sleeve 65, in a manner well known to those skilled in the art.

The toothed interaction of the star 71, orbiting and rotating within the ring 69, defines a plurality of expanding and contracting fluid volume chambers 85, and adjacent each chamber 85, the port plate 35 defines a plurality of fluid ports 87. The valve housing 33 further defines a plurality of axial bores 89, each of which is in open communication with one of the fluid ports 87, and therefore, with one of the volume chambers 85. The valve housing 33 further defines a plurality of radial bores 91 which provide communication between each of the axial bores 89 and the valve bore 59, as will be described in greater detail subsequently.

Figure 3:
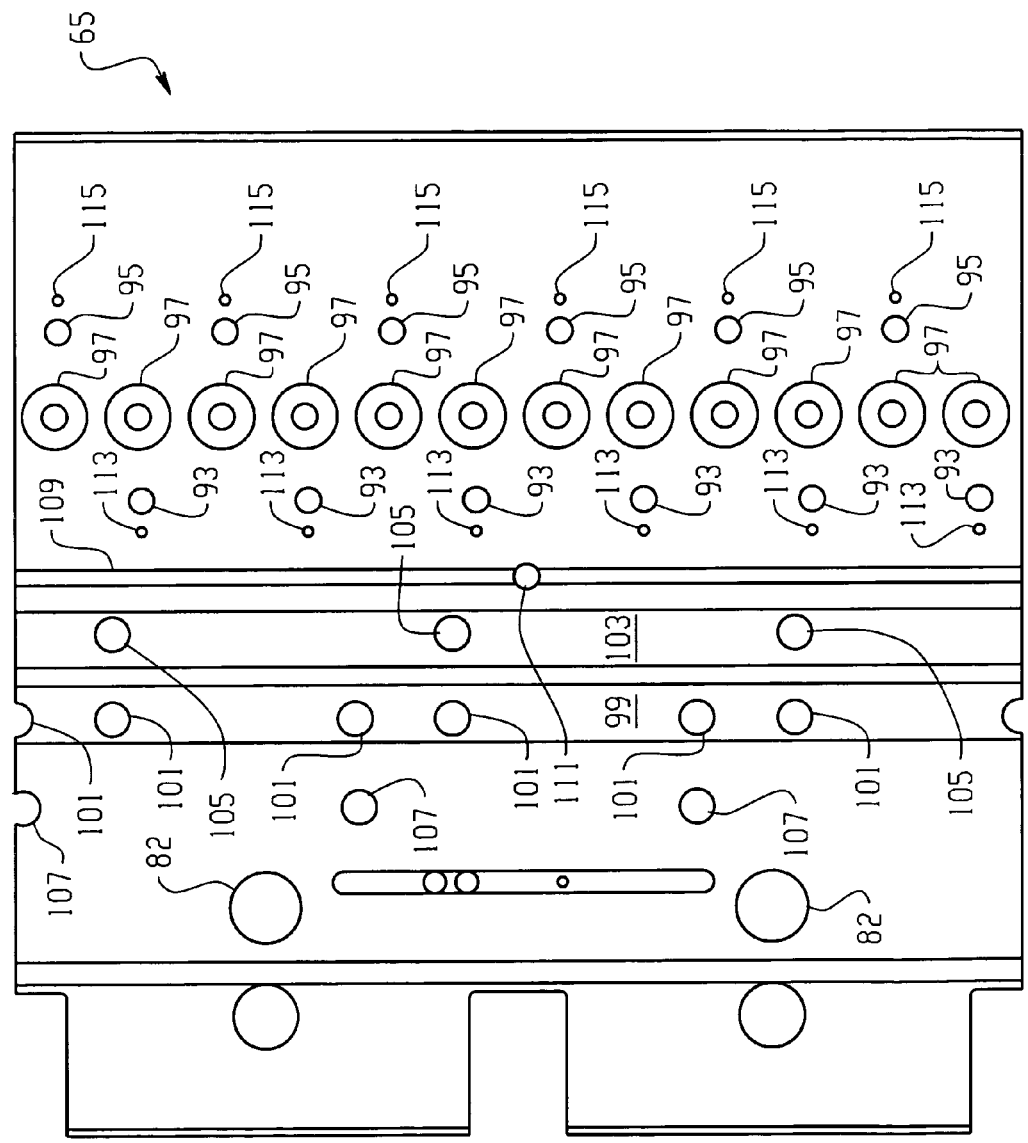
FIG. 3 is a flat, layout view of the follow-up valve member of the fluid controller shown in FIG. 2.
Figure 3A:
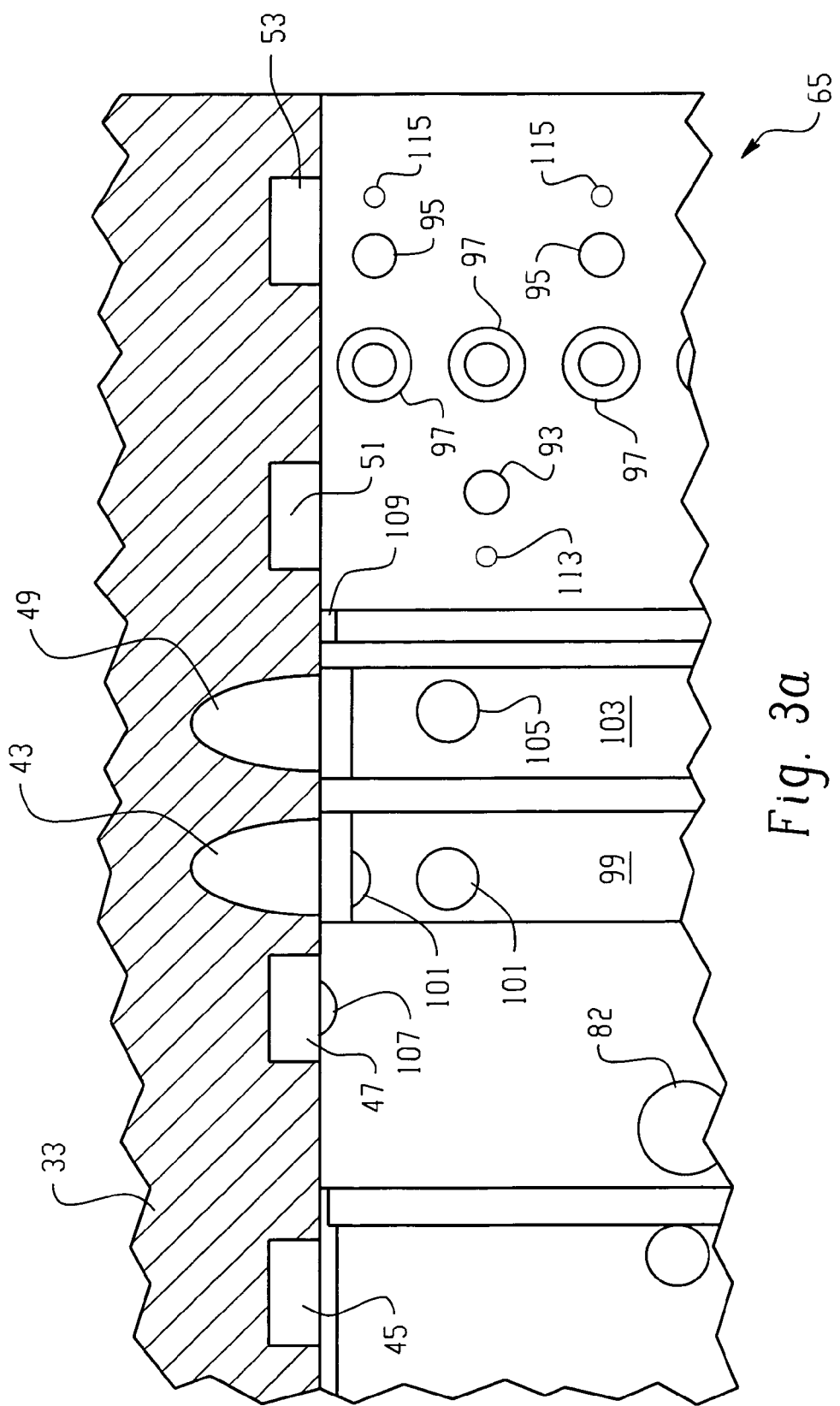
FIG. 3a is an fragmentary elevation view of the follow-up valve member of the fluid controller shown in FIG. 2, with a portion of the valve housing (in axial cross-section) included.

Referring now to FIG. 3 and FIG. 3a, and with reference also being made to elements illustrated in FIG. 2, the sleeve 65 defines a plurality of left and right secondary cylinder ports 93, 95, respectively, and a plurality of fluid commutating ports 97. The left and right secondary cylinder ports 93, 95 are axially located in the sleeve 65 such that the secondary cylinder ports 93, 95 are in open fluid communication with the annular grooves 51 and 53, respectively, in the valve housing 33. The fluid commutating ports 97 are axially located in the sleeve 65 between the secondary cylinder ports 93, 95 and are axially aligned with the radial bores 91 in the valve housing 33. In respect to the fluid commutation ports 97, the left and right secondary cylinder ports 93, 95 are circumferentially located in the sleeve 65 in an alternating pattern with the left secondary cylinder ports 93 disposed to the left of every other one of the fluid commutating ports 97 and the right secondary cylinder ports 95 disposed to the right of every other one of the fluid commutating ports 97.

The sleeve 65 further defines a circumferential pressure groove 99 that is axially located in the sleeve 65 such that the circumferential pressure groove 99 is in open fluid communication with the fluid inlet passage 43 in the valve housing 33, and therefore, with the fluid inlet port 15. A plurality of pressure ports 101 are disposed within the circumferential pressure groove 99. These pressure ports 101 provide fluid communication between the pressure groove 99 and the interior of the sleeve 65.

The sleeve 65 also defines a circumferential primary cylinder groove 103 that is axially located in the sleeve 65 such that the primary cylinder groove 103 is in open fluid communication with the right primary control fluid passage 49 in the valve housing 33. A plurality of right cylinder ports 105 are disposed within the primary cylinder groove 103 and provide fluid communication between the groove 103 and the interior of the sleeve 65. A plurality of left cylinder ports 107 are axially located in the sleeve 65 such that the left cylinder ports 107 are in open fluid communication with the annular groove 47 in the valve housing 33. In regard to the pressure groove 99 and the pressure ports 101, the right and left cylinder ports 105, 107 are circumferentially located in the sleeve 65 in an alternating pattern. The left cylinder ports 107 are disposed to the left of the pressure groove 99 and circumferentially aligned with every other one of the pressure ports 101. The right cylinder ports 105 are disposed to the right of the pressure groove 99 and circumferentially aligned with every other one of the pressure ports 101.

The sleeve 65 further defines a circumferential pressure relieving groove 109 that is located axially between the right primary control fluid passage 49 and the annular groove 51 in the valve housing 33. The sleeve 65 also defines a relieving port 111 which provides fluid communication between the relieving groove 109 and the interior of the sleeve 65.

In addition to the features defined above, the sleeve 65 also defines a plurality of left and right secondary cylinder pressure relieving ports 113, 115 which are axially disposed in the sleeve 65 to allow for fluid communication between the annular grooves 51 and 53, respectively, and the interior of the sleeve 65.

Figure 4:
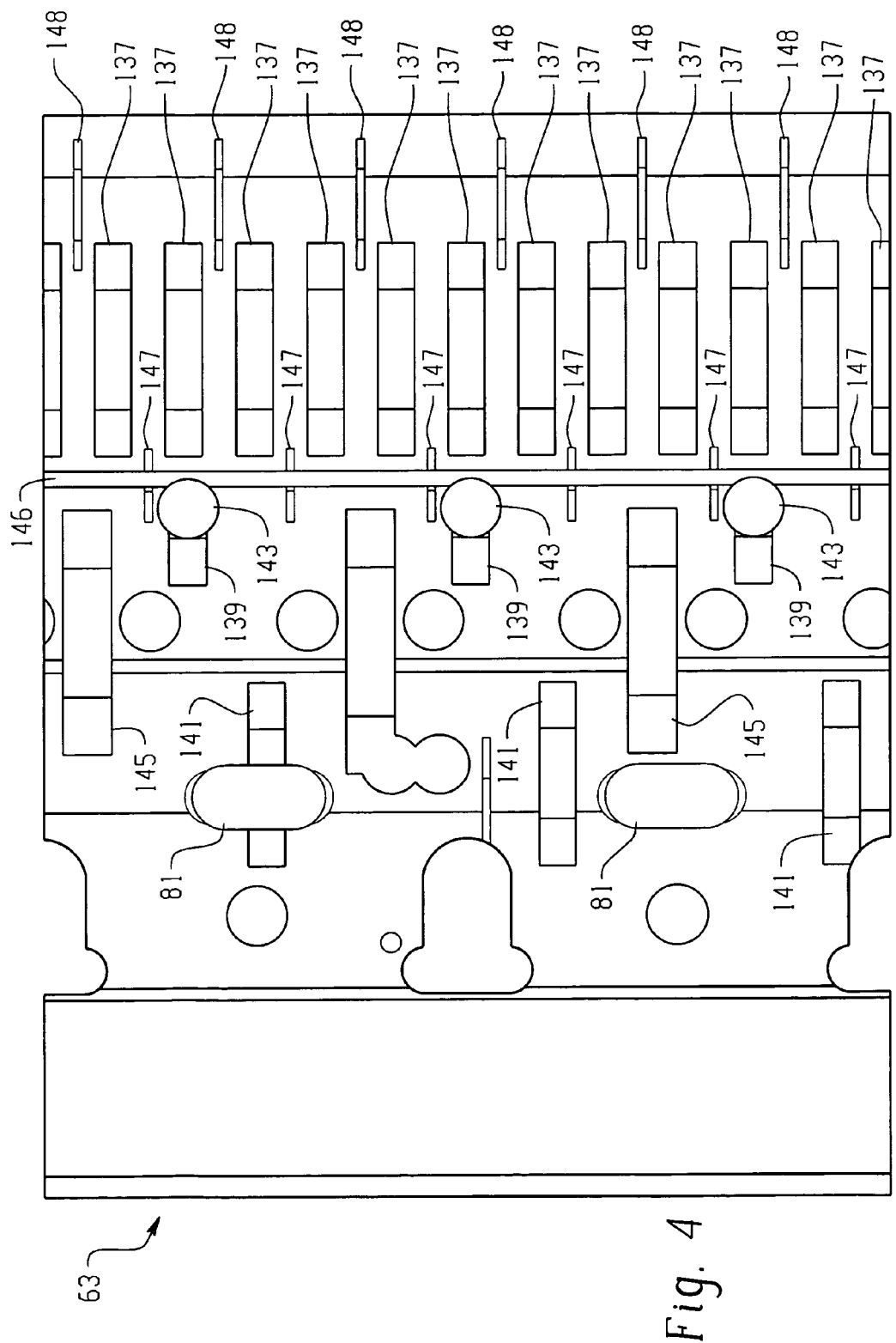
FIG. 4 is a flat, layout view of the primary, rotatable valve member of the fluid controller shown in FIG. 2.

Referring now to FIG. 4, and with reference also being made to elements illustrated in FIG. 3, the spool 63 defines a plurality of axially-oriented fluid meter grooves 137, the ends of which are axially aligned with the left and right secondary cylinder pressure relieving ports 113,115 in the sleeve 65 (see FIG. 5). The fluid meter grooves 137 are equally spaced circumferentially about the spool 63.

The spool 63 further defines a plurality of axially-oriented right and left cylinder return grooves 139, 141, respectively. The right and left cylinder return grooves 139, 141 are axially disposed on the spool 63 such that the right cylinder return grooves 139 are aligned with the right cylinder port 105 in the sleeve 65 and the left return grooves 141 are aligned with the left cylinder port 107 in the sleeve 65. A plurality of spool return ports 143 are axially disposed in the spool such that the spool return ports 143 are in open fluid communication with the right cylinder return grooves 139. The spool return ports 143 provide fluid communication between the right cylinder return groove 139 and the interior of spool 63.

The spool 63 further defines a plurality of cylinder inlet grooves 145 which are axially located on the spool 63 such that the cylinder inlet grooves 145 provide fluid communication between the pressure ports 101 and either the right or left cylinder ports 105, 107 in the sleeve 65, depending upon the direction of displacement (i.e., right turn or left turn) of the spool 63 with respect to the sleeve 65.

Also defined by the spool 63 is a spool pressure relieving groove 146. The spool pressure relieving groove 146 is axially aligned with the pressure relieving groove 109 and pressure relieving port 111 in the sleeve 65. The spool pressure relieving groove 146 intersects (or at least, is in open fluid communication with) the spool return ports 143, thereby allowing any fluid in the pressure relieving groove 146 to be communicated to the interior of the spool 63.

A plurality of left and right secondary cylinder pressure relieving grooves 147, 148 are axially aligned on the spool 63 to allow communication between the left and right secondary cylinder pressure relieving ports 113, 115 in the sleeve 65 and the interior of the spool 63 when the fluid controller 17 is in the neutral position, shown in FIG. 5. The left secondary cylinder pressure relieving grooves 147 are in communication with the spool pressure relieving groove 146. The right secondary cylinder pressure relieving grooves 148 connect the right secondary cylinder pressure relieving ports 115 with a portion of the spool that has a smaller outer diameter (the right end in FIG. 4), thereby allowing fluid to freely flow to the interior of the spool 63.

Referring now primarily to FIG. 5, when the valving arrangement 61 is in the neutral position (no rotation of the input device, and therefore, no rotation of the spool 63), pressurized fluid is communicated from the inlet port 15 to the fluid inlet passage (not shown) in the valve housing 33. The fluid is then communicated to the circumferential pressure groove 99 in the sleeve 65 and through the pressure ports 101. When the valving arrangement 61 is in neutral, however, the flow through the pressure ports 101 is blocked by the outer surface of the spool 63, thereby resulting in no fluid communication to the primary steering cylinder 19, and therefore, no movement of the steering device (cylinder, etc.).

Referring still primarily to FIG. 5, when the valving arrangement 61 is in the neutral position, the left and right secondary cylinder ports 93, 95 as well as the fluid commutating ports 97 are also blocked by the outer surface of the spool 63, thereby resulting in no fluid communication between the secondary cylinder 31 and the fluid meter 37.

Therefore, in the subject embodiment, the valving 61 is of the type referred to as "closed center," although it will be apparent to those skilled in the art that the invention is not limited to closed-center valving, but the invention could also utilize valving of either open center type, or of the load sensing type.

FIG. 6 is a fragmentary view that illustrates an "operating" condition in which the spool 63 is displaced (or "deflected"), relative to the sleeve 65, which corresponds to the left turn position (i.e., the spool 63 moves "downward" in FIG. 6, relative to the sleeve 65). With the spool 63 displaced, pressurized fluid is communicated from the inlet port 15 to the fluid inlet passage (not shown) in the valve housing 33. The fluid is then communicated to the circumferential pressure groove 99 and through the pressure ports 101 in the sleeve 65. In this displaced position of the spool 63, pressurized fluid from the pressure ports 101 is communicated to the left cylinder ports 107 by the cylinder inlet grooves 145 in the spool 63. Pressurized fluid then flows through the left cylinder ports 107 to the left primary control fluid annular groove 47 in the valve housing 33. The pressurized fluid is then communicated through a fluid passage to the left primary control fluid port 21 and to the left side of the primary steering cylinder 19, thus resulting in displacement of the primary steering cylinder 19.

Return fluid from the right side of the primary steering cylinder 19 is communicated to the right primary control fluid port 23 in the fluid controller 17. The return fluid is then communicated through the right primary control fluid passage (not shown) in the valve housing 33 to the circumferential primary cylinder groove 103 in the sleeve 65, where the fluid enters the right cylinder ports 105. Due to the displacement of the spool 63, the return fluid in the right cylinder ports 105 in the sleeve is communicated to the interior of the spool through the right cylinder return grooves 139 and the spool return ports 143. The return fluid then passes through the interior of the spool 63 and radially outward through the spring openings into the annular groove 45 which communicates with the return port 25.

Referring still primarily to FIG. 6 with reference made to elements illustrated in FIG. 1, the primary cylinder 19 is coupled, either mechanically or electronically (shown schematically as 149), to the secondary cylinder 31, such that displacement of the primary cylinder 19 results in proportional corresponding displacement of the secondary cylinder 31. Therefore, as described above, and by way of example only, when pressurized fluid enters the left side of the primary cylinder 19, the primary cylinder 19 is displaced. This in turn causes proportional displacement of the secondary cylinder 31 through the mechanical or electronic linkage 149. The displacement of a piston (no reference numeral) within the secondary cylinder 31 increases the pressure of the fluid contained in the right side of the secondary cylinder 31. This pressurized fluid is returned to the fluid controller 17 through the right secondary control fluid port 29. The pressurized fluid is then communicated from the right secondary control fluid port 29 to the right secondary cylinder ports 95 in the sleeve 65 through the right secondary control fluid passage 57 and the annular groove 53 in the valve housing 33. The pressurized fluid passes through the right secondary cylinder ports 95 in the sleeve 65, then through the fluid meter grooves 137 in the spool 63 to the fluid commutating ports 97 in the sleeve. The pressurized fluid is then communicated to the expanding volume chambers 85 in the fluid meter 37, through the radial bores 91 and axial bores 89 in the valve housing 33 and through the fluid ports 87 in the port plate 35. The pressurized fluid in the volume chambers of the fluid meter 37 causes orbital and rotational movement of the star 71, which causes follow-up movement of the sleeve 65, as described above.

Return fluid from the contracting volume chambers 85 in the fluid meter 37 is communicated to the fluid commutating ports 97 in the sleeve 65 through the fluid ports 87 in the port plate 35 and through the axial bores 89 and radial bores 91 in the valve housing 33. The return fluid then passes through the fluid commutating ports 97 in the sleeve 65 and the fluid meter grooves 137 in the spool 63 to the left secondary cylinder port 93 in the sleeve 65. The return fluid from the contracting volume chambers 85 is then communicated to the left end (as shown in FIG. 1) of the secondary cylinder 31 through the annular groove 51, the left secondary control fluid passage 55, and the left secondary control fluid port 27 in the valve housing 33.

An important aspect of the present invention is that the main fluid path 18 and the secondary fluid path 26 described above are maintained separate from each other. The main fluid path 18 provides pressurized fluid from the pump to the primary steering cylinder 19 without communicating main fluid flow to the secondary cylinder 31. However, while the main fluid path 18 and the secondary fluid path 26 are described as separate, there is likely to be leakage in the secondary fluid path 26. To account for this leakage, fluid will be communicated from the main fluid path 18 to the secondary fluid path 26, as shown schematically in FIG. 1 by check balls 151. Therefore, "separate," as used herein, means that the main fluid path 18 and the secondary fluid path 26 are not intended to be in fluid communication but that some fluid communication may occur due to leakage.

Due to the separate fluid paths described above, the present invention can be used to provide a substantial amount of fluid through a fluid controller 17 which has a relatively small displacement fluid meter 37. As mentioned in the BACKGROUND OF THE DISCLOSURE, larger fluid meters in a fluid controller add substantially to the size and cost of the controller. Thus, it is advantageous to use a small displacement fluid meter to reduce the cost and size of a controller. As is well known to those skilled in the art, the displacement of the fluid meter in the prior art fluid controller is a function of the desired displacement of the primary steering cylinder. However, in the present invention, the displacement of the fluid meter 37 is independent of the displacement of the primary steering cylinder and only dependent on the displacement of the secondary cylinder 31. Thus, when the present invention is used with a secondary cylinder 31 with a substantially smaller displacement than the primary steering cylinder 19, the present invention would require a fluid meter 37 with a substantially smaller displacement than would be required by a prior art fluid controller used with the same primary steering cylinder. For example, if a large displacement primary cylinder is used with a substantially smaller displacement secondary cylinder, the ratio of fluid flow through the main fluid path 18 to the fluid flow through the secondary fluid path 26 could be 10:1 or 20:1 or as much as 40:1 or higher.

Figure 7:
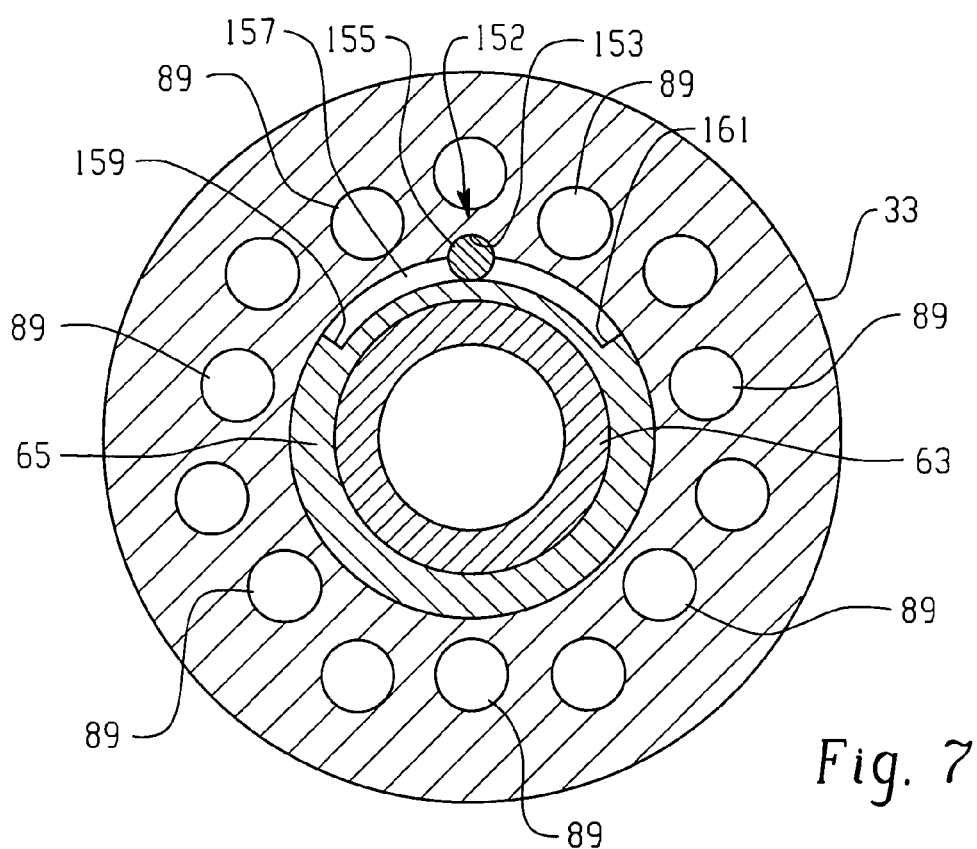
FIG. 7 is a transverse cross-section of the fluid controller of the present invention taken on line 7-7 in FIG. 2, illustrating one particular aspect of the invention.

In large vehicle applications, it is sometimes preferred to have the total rotation, "lock-to-lock," of the input device be less than one complete turn. This is accomplished in the present invention by the use of a follow-up constraint arrangement, generally designated 152. Referring now to FIG. 7, valve housing 33 defines a detent cavity 153. A detent member 155 resides in the detent cavity 153 in the valve housing 33 and extends into an arcuate groove 157 defined in the sleeve 65. In the clockwise direction, the valving arrangement 61 rotates, upon rotation of the input device, until the detent member 155 contacts a first arcuate end 159 of the arcuate groove 157. Upon contact of the detent member 155 with the first arcuate end 159, the sleeve 65 is prohibited from further rotation in the clockwise direction. In the counterclockwise direction, the valving arrangement 61 rotates, upon rotation of the input device, until the detent member 155 contacts a second arcuate end 161 of the arcuate groove 157. Upon contact of the detent member 155 with the second arcuate end 161, the sleeve 65 is prohibited from further rotation in the counterclockwise direction. As shown in FIG. 7, the follow-up constraint arrangement 152 limits rotation of the sleeve 65 to about 45 degrees from the neutral position in either direction of rotation. This amount of rotational limitation, however, could be increased or decreased in other embodiments of the invention.

Figure 8:
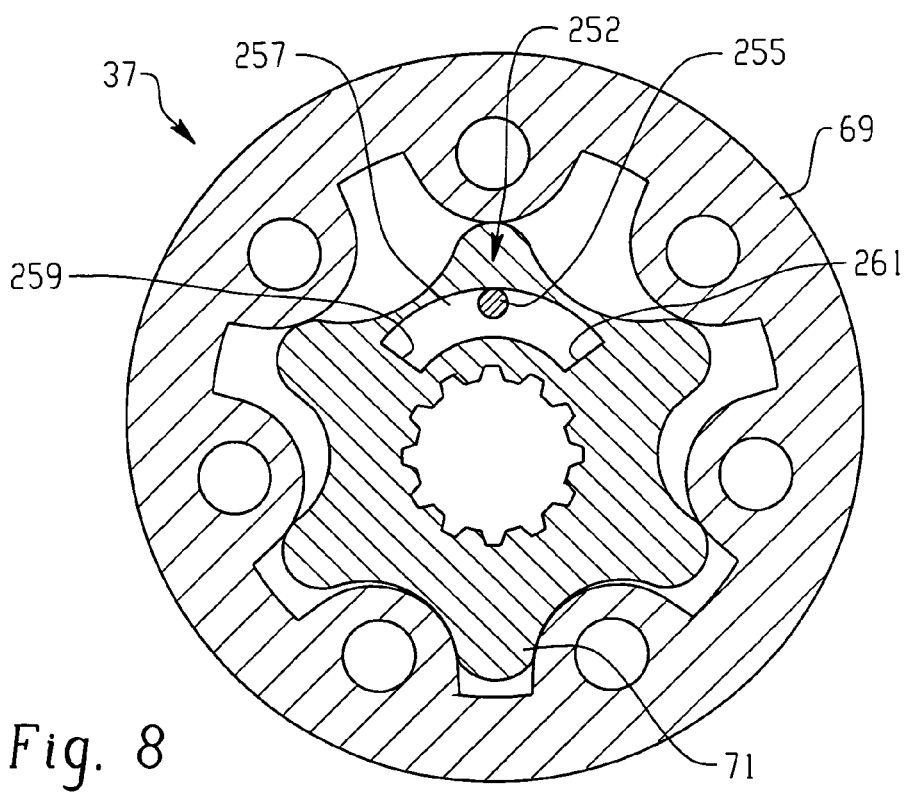
FIG. 8 is a transverse cross-section, taken on line 8-8 in FIG. 2, showing an alternative embodiment of the follow-up constraint arrangement shown in FIG. 7.

FIG. 8 illustrates an alternate embodiment of the follow-up constraint arrangement, generally designated 252. The end plate 39 defines a detent cavity (not shown). A detent 255 resides in the detent cavity (not shown) in the end plate 39 and extends axially into an arcuate groove 257 defined in the star 71. In the clockwise direction, the star 71 rotates until the detent 255 contacts a first arcuate end 259 of the arcuate groove 257. Upon contact of the detent 255 with the first arcuate end 259, the star 71 is prohibited from further rotation in the clockwise direction. In the counterclockwise direction, the star 71 rotates until the detent 255 contacts a second arcuate end 261 of the arcuate groove 257. Upon contact of the detent 255 with the second arcuate end 161, the star 71 is prohibited from further rotation in the counterclockwise direction. As previously discussed, movement of the star 71 results in follow-up movement of the sleeve 65. Therefore, rotational limits of the star result in rotational limits of the sleeve 65. While the follow-up constraint arrangement 252, as shown in FIG. 8, limits rotation of the sleeve 65 to about 45 degrees from the neutral position in either direction of rotation, this amount of rotational limitation could be increased or decreased.

During operation of the present invention, the position of the input device is associated with (in "registry" with) the position of the primary cylinder 19. Leakage in the fluid controller 17 will result in loss of registry of the input device and the primary cylinder 19. However, when the sleeve 65 is prohibited from further rotation due to the interaction between the detent 155; 255 and either the first or second arcuate end 159; 259, 161; 261, the spool 63 can still be fully deflected relative to the sleeve 65, thereby reestablishing registry of the position of the input device and the position of the primary cylinder 19.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A controller operable to control the flow of fluid from a source of pressurized fluid to a first fluid pressure actuated device; said controller being of the type including housing means defining an inlet port for connection to the source of pressurized fluid, a return port for connection to a system reservoir, and first and second control fluid ports for connection to said first fluid pressure actuated device; a valve means disposed in said housing means with said valve means defining a neutral position (FIG. 5) and a first operating position (FIG. 6); said valve means and said housing means cooperating to define a main fluid path communicating between said inlet port and said first control fluid port, and between said second control fluid port and said return port when said valve means is in said first operating position; a fluid actuated means for imparting follow-up movement to said valve means proportional to the volume of fluid flow through said fluid actuated means; characterized by:

(a) a second fluid pressure actuated device the displacement of which is representative of the displacement of said first fluid pressure actuated device when said valve means is displaced from said neutral position to said first operating position;

(b) a second fluid path communicating between said fluid actuated means and said second fluid actuated device; and (c) said second fluid path being separate from said main fluid path.

2. A controller as claimed in claim 1 characterized by said valve means comprising a rotatable primary valve member and a cooperating, relatively rotatable follow-up valve member.

3. A controller as claimed in claim 1 characterized by a mechanical linkage between said first fluid pressure actuated device and said second fluid pressure actuated device which transmits the displacement of said first fluid pressure actuated device into corresponding displacement of said second fluid pressure actuated device.

4. A controller as claimed in claim 1 characterized by the displacement of said second fluid pressure actuated device being substantially less than the displacement of said first pressure actuated device.

5. A controller as claimed in claim 1 characterized by a follow-up constraint arrangement disposed in said controller that limits the follow-up movement of said follow-up valve member relative to said housing means.

6. A controller as claimed in claim 5 characterized by said follow-up constraint arrangement directly limiting the rotation of said follow-up valve member with a detent means.

7. A controller as claimed in claim 6 characterized by said detent means being disposed in said housing means and being operably associated with said follow-up valve member.

8. A controller as claimed in claim 5 characterized by said follow-up constraint arrangement directly limiting the rotation of said fluid actuated means by means of a detent means.

9. A controller as claimed in claim 8 characterized by said detent means being disposed in an adjacent plate to the fluid actuated means and being operably associated with said fluid actuated means.

10. A controller as claimed in claim 5 characterized by the rotation of said follow-up valve member, in moving to said first operating position from said neutral position, being less than about 45 degrees.

* * * * *